United States Patent Office 3,234,153
Patented Feb. 8, 1966

3,234,153
PREPARATION OF A CELLULAR POLY-
URETHANE PLASTIC
J. W. Britain, New Martinsville, W. Va., assignor to
Mobay Chemical Company, Pittsburgh, Pa., a corporation of Delaware
No Drawing. Filed Sept. 8, 1964, Ser. No. 395,066
5 Claims. (Cl. 260—2.5)

This invention relates generally to new catalysts which are particularly well suited for modifying the reaction between organic polyisocyanates and organic compounds having hydrogen atoms which react with an isocyanate group to form urethane linkages and to an improved process for making cellular polyurethane plastics. This application is a continuation-in-part of applicant's application Serial No. 310,871, filed September 23, 1963, now abandoned, which is in turn a continuation of application No. 745,255, filed June 30, 1958, now abandoned.

Solidified cellular polyurethanes may be formed by reacting an organic polyisocyanate with water and an organic compound having hydrogen atoms which are reactive with the —NCO groups of the polyisocyanate to form a urethane of urea linkage. During these reactions, carbon dioxide is formed when water and an isocyanate group react together. Simultaneously, a viscous liquid is formed by reaction between the organic compound having reactive hydrogen atoms and the organic polyisocyanate. The carbon dioxide becomes entrapped in the viscous liquid and remains therein as solidification occurs. Consequently, the product is a porous or cellular plastic.

It has been found that tertiary amines tend to accelerate the reaction which results in the formation of the cellular polyurethane. However, most of the heretofore available tertiary amines have some undesirable characteristics which detract from their generally advantageous properties. Some of the heretofore available catalysts are too volatile to remain in the reaction mixture until chemical reaction has been completed. Others impart an obnoxious odor to the product. Still others are unsatisfactory because they are toxic.

It is, therefore, an object of this invention to provide new catalysts, particularly advantageous for use in preparing cellular polyurethanes. Another object of the invention is to provide an improved catalyst for modifying the chemical reactions which produce cellular polyurethanes. Still another object of the invention is to provide an improved process for making polyurethanes and, particularly, to provide a process wherein an isocyanate terminated compound is reacted with water to form a cellular polyurethane. A further and more specific object of the invention is to provide a process for making polyurethanes which are substantially free from obnoxious odors. A still further object of this invention is to provide a catalyst for making a foam having a shorter tack-free time.

The foregoing objects and others which will become apparent from the following description are accomplished in accordance with this invention, generally speaking, by providing as a catalyst N,N-bis(3-dimethyl amino propyl) acetamide and/or a compound having the formula

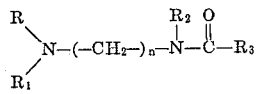

wherein

is selected from the group consisting of

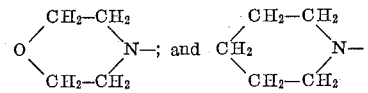

$R_2$ is a member selected from the group consisting of hydrogen and an alkyl radical and $R_3$ is selected from the group consisting of an alkyl radical and $CH_2=CH-$, and $n$ is an integer of at least 2. These compounds and particularly N(3-acetamido propyl) morpholine and N,N-bis(3-dimethylamino propyl) acetamide have been found to be particularly advantageous as a catalyst for a reaction wherein an organic polyisocyanate, water and an organic compound having hydrogen atoms reactive with the —NCO group of the polyisocyanate react together to form a cellular polyurethane. A compound having the formula

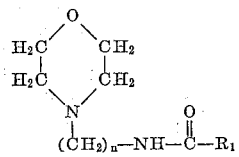

wherein $n$ is an integer of at least 2 and preferably not more than 6 and $R_1$ is an alkyl radical of not more than 4 carbon atoms is a suitable catalyst. Other catalysts provided herein include N(3-dimethylamino propyl) acrylamide, N(2-acetamido ethyl) morpholine, N(4-acetamido butyl) morpholine, N(3-acetamido propyl) piperidine, and the like. The invention, thus, contemplates a process for making cellular polyurethanes from the aforesaid components including one or more of the catalytic compounds provided by this invention.

The catalyst provided by this invention is effective for making a polyurethane from any of the known reactants. The organic compound having reactive hydrogen atoms may be any suitable compound of this type, such as, for example, a polyester, a polyalkylene ether glycol, a polyalkylene thioether glycol, a polyester amide, a polyacetal, the polymer formed by condensation of carbon monoxide and an olefine, and the like. Suitable organic compounds having reactive hydrogens are disclosed in U.S. Patents 2,764,565. Such compounds have hydrogen atoms determinable by the Zerewithinoff method. The polyester may be prepared by esterification of a dicarboxylic acid and a polyhydric alcohol. Any suitable dicarboxylic acid may be used, such as, for example, adipic acid, succinic acid, maleic acid, or the like, any suitable polyhydric alcohol, such as, for example, ethylene glycol, diethylene glycol, propylene glycol, trimethylol propane, glycerine, and the like. Preferably, an excess of the alcohol is used in the esterification in order that the resulting polyester will have terminal alcoholic hydroxyl groups instead of terminal carboxyl groups.

Preferably, the organic compound having reactive hydrogen atoms should have a molecular weight of at least about 500 and an —OH number of not more than about 225. Preferably, the acid number of the polyester should be in the neighborhood of from zero to about two. The molecular weight of the adduct or prepolymer prepared by reaction of a polyisocyanate and an organic compound having reactive hydrogens should be at least 1000.

The polyalkylene ether glycol may be prepared in known manner by condensing an alkylene oxide, such as, for example, ethylene, oxide, propylene oxide, butylene oxide, and the like, or by condensation of one of these oxides with a suitable glycol, such as, for example, ethylene glycol, diethylene glycol, or the like. The polyalkylene thioether glycol may be prepared by condensation of a thioglycol, such as, for example, dithioglycol or by condensation of a thioglycol with a glycol. The product of the latter process will contain both oxygen and sulfur hetero atoms in its chain.

The polyacetal may be prepared by condensing a suitable aldehyde with an alkylene oxide, such as, for example, formaldehyde and ethylene oxide. The polyesteramide may be prepared by esterification of a dicarboxylic acid with an amino alcohol, such as, for example, ethanolamine and adipic acid.

Any suitable organic polyisocyanate including those disclosed in U.S. Patent 2,764,565 may be used for reacting with the water and organic compound having reactive hydrogen atoms. Examples of suitable polyisocyanates are 2,4-toluylene diisocyanate, 2,6-toluylene diisocyanate, ethylene diisocyanate, propylene - 1,2 - diisocyanalte, cyclohexylene-1,2 - diisocyanate, 3,3' - dichloro-4,4' - diphenylene diisocyanate, triphenyl methane triisocyanate, 4,4'-diphenyl methane diisocyanate, and the like. Organic polyisothiocyanates, such as, for example, ethylidene diisothiocyanate, butylene - 1,3 - diisocyanate, paraphenylene diisothiocyanate, may be used instead of the organic polyisocyanates if desired. In other words, any compound having the formula $R(NCX)_n$, wherein R is a divalent organic radical, either aromatic or aliphatic, X is either oxygen or sulfur and $n$ is an integer of at least 2, usually two or three, may be used. Oxygen and sulfur are chalkogens having a molecular weight of less than 33.

The catalyst and other components of the polyurethane plastic may be mixed together by any suitable means, but it has been found particularly advantageous to use an apparatus of the type disclosed in the Hoppe et al. U.S. Patent 2,764,565. The components must be mixed together rapidly and the resulting mixture must be discharged into the shaping apparatus immediately after mixing in order to avoid solidification of the reaction liquid in the mixing apparatus. It has been found that the most desirable cellular polyurethane plastic in formed when a polyalkylene ether glycol is mixed with an excess of an arylene diisocyanate and the resulting prepolymer of adduct having terminal —NCO groups is then mixed with additional polyisocyanate and water and a catalytic compound provided by this invention. The preparation of cellular polyurethanes by this process is, thus, preferred.

Each of the novel compounds provided by this invention may be used as a catalyst in the preparation of cellular polyurethane plastic, which, in turn, have many commercial uses, such as, for example, as interlinings in clothing, cushions, upholstery, carpet underlay, crash pads for the dashboard of automobiles, sponges, and the like.

The catalysts provided by this invention may be prepared by any known method. One method for making them involves reacting an appropriate diamine with a suitable anhydride. Using the preparation of N(3-acetamidopropyl) morpholine as an example, the process involves first reacting N-aminopropyl morpholine with acetic anhydride and decomposing the resulting amide amine acetate into the desired N(3-acetamidopropyl) morpholine and acetic acid. In one embodiment of this process about 4000 parts by weight acetic anhydride are placed in a suitable reaction vessel equipped with a stirrer and reflux condenser. About 3940 parts by weight of N-aminopropyl morpholine are added slowly in order that the temperature never exceeds 80° C. The resulting mixture is stirred without heating for about one hour.

About 7500 parts by weight of a 50% aqueous solution of sodium hydroxide is added to the reaction mixture and stirred. Stirring is stopped after the two liquids have been mixed thoroughly and the mixture separates into two layers. The top layer is dried over KOH pellets and distilled under reduced pressure.

In lieu of the treatment with sodium hydroxide, the product obtained by the reaction of N-aminopropyl morpholine and acetic anhydride may be distilled under reduced pressure in a fractionating column. The product is the highest boiling fraction.

In order better to describe and further clarify the invention, the following are specific embodiments of the invention.

*Example 1*

About 100 parts by weight of a polyalkylene ether glycol prepared by condensing propylene oxide and then condensing the resulting polymer with sufficient ethylene oxide to provide an ether containing about 10 percent of $(C_2H_4O)$ groups in the chain and having a molecular weight of about 1,800 are mixed with about 3 parts by weight trimethylol propane and about 0.02 part benzoyl chloride. The resulting mixture is heated to about 60° C. and about 20 parts of an 80/20 mixture of 2,4- toluylene diisocyanate and 2,6-toluylene diisocyanate are incorporated therein. The mixture is heated further until the temperature is from about 90° C. to about 100° C. and the viscosity of the mass at about 70° C. is from about 1,200 centipoises to about 1,400 centipoises. The viscosity is determined with a Brookfield Spinning Disc Viscosimeter with a Number 4 spindle.

The resulting prepolymer having terminal —NCO groups is mixed with about 4 parts 80/20 mixture of 2,4-toluylene diisocyanate and 2,6-toluylene diisocyanate, about 2.5 parts by weight water and about 1 part N(3-acetamido propyl) piperidine per 100 parts prepolymer. After these components have been completely mixed together, the reaction mixture is discharged immediately into a suitable shaping device, such as, a mold where chemical reaction proceeds with the formation of a solidified cellular polyurethane having a density of about 2 pounds per cubic foot. The water, catalyst and prepolymer are preferably mixed together in an apparatus similar to that disclosed in the Hoppe et al. patent. Preferably, the prepolymer has a temperature of about 38° C. as it enters the mixing chamber. The cellular product obtained is substantially free from any obnoxious odor immediately after solidification thereof. Only very small quantities of the catalyst, such as, for example, about 0.5 percent to about 7 percent are required because of the effectiveness of the catalyst. It is pointed out that the reaction between the polyalkylene ether glycol and toluylene diisocyanate which results in the prepolymer is conducted preferably under substantially anhydrous conditions to avoid the formation of carbon dioxide in this stage of the process.

*Example 2*

About 100 parts by weight of a polyalkylene ether glycol prepared in accordance with the process described in Example 1 and having a molecular weight of about 1800 are mixed with about 3 parts by weight trimethylol propane and about 0.02 part benzoyl chloride. The resulting mixture is heated to about 60° C. and about 20 parts of an 80/20 mixture of 2,4-toluylene diisocyanate and 2,6-toluylene diisocyanate are incorporated therein. Heating is continued until the temperature has reached from about 90° C. to about 100° C. and the viscosity of the mass at about 73° C. is from about 1200 centipoises to about 1400 centipoises. The viscosity is determined with a Brookfield Spinning Disc Viscosimeter using a Number 4 spindle.

About 100 parts of the resulting prepolymer having terminal —NCO groups is mixed with about 4 parts 80/20 mixture of 2,4-toluylene diisocyanate and 2,6-toluylene diisocyanate, about 2.5 parts by weight water and about 1.5 parts

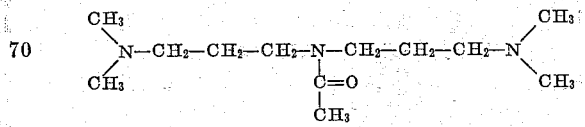

The resulting mixture is discharged substantially immediately after the components have been thoroughly mixed together. Chemical reaction proceeds and a solidified cellular polyurethane having a density of about 2 pounds per cubic foot is obtained. The apparatus disclosed by Hoppe et al. in U.S. Patent 2,764,565 is preferably used to effect mixing of the components. The temperature of the prepolymer as it enters the mixing chamber is about 38° C. The product is substantially free from any obnoxious odor.

*Example 3*

About 100 parts of polypropylene ether glycol prepared by condensing propylene oxide and having a molecular weight of about 2,000 are mixed with about 3 parts by weight trimethylol propane and about 0.02 part benzoyl chloride. This mixture is heated to about 60° C. and about 20 parts of an 80/20 mixture of 2,4-toluylene diisocyanate and 2,6-toluylene diisocyanate are mixed therewith. Heating is continued until a temperature of from about 90° C. to about 100° C. is reached and the temperature is maintained within this range until the viscosity of the mass at 73° C. is from about 1,200 centipoises to about 1,400 centipoises. The viscosity is determined with a Brookfield Spinning Disc Viscosimeter using a Number 4 spindle.

About 100 parts of the resulting prepolymer and any unreacted toluylene diisocyanate present are mixed with about 3 parts 80/20 mixture of 2,4-toluylene diisocyanate and 2,6-toluylene diisocyanate, about 0.5 part

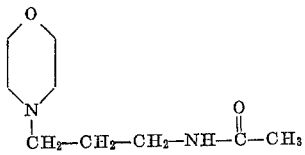

and about 2 parts water. Chemical reaction proceeds after the components have been mixed together and a solidified cellular polyurethane having a density of about 2.5 pounds per cubic foot is obtained.

The product obtained in Example 3 is substantially free from any obnoxious odor.

It is to be understood that any of the catalysts disclosed herein may be substituted for those used in the foregoing examples. Likewise, other polyisocyanates and other organic compounds having reactive hydrogen atoms disclosed herein, such as, polyesters or the like, may be substituted by those used in the foregoing examples.

The catalyst is to be used in catalytic amounts. Usually from about 0.25 part to about 2 parts by weight catalyst per 100 parts prepolymer or per 100 parts organic compound having reactive hydrogen atoms and polyisocyanate mixture are preferred. The catalyst may be mixed with water and used in this form if desired or it may be mixed separately with the other components. Preferably, the organic compounds having the reactive hydrogen atoms should have a molecular weight of at least 500 and usually they will not have a molecular weight greater than about 10,000. Preferably, the acid number of the polyester should be from zero to not more than about 2. The hydroxyl number should be not more than about 225. The molecular weight of the adduct or prepolymer prepared by reaction of a polyisocyanate and an organic compound having reactive hydrogens should be at least about 1,000.

Although the invention has been described in considerable detail in the foregoing for the purpose of illustration, it is to be understood that such detail is solely for this purpose and that variations can be made by those skilled in the art without departing from the spirit and scope of the invention except as set forth in the claims.

What is claimed is:

1. In the preparation of a cellular polyurethane plastic by a process which comprises reacting a compound having the formula $R(NCX)_n$, wherein R is a divalent organic radical, X is a chalkogen having a molecular weight of less than 33, and $n$ is an integer of at least 2, water and a member selected from the group consisting of a polyester prepared by esterification of a dicarboxylic acid and a polyhydric alcohol, a polyalkylene ether glycol, a polyalkylene thioether glycol and a polyacetal prepared by condensing an aldehyde with an alkylene oxide, said group member having a molecular weight of at least about 500 and an hydroxyl number of not more than about 225, said polyester having an acid number of from about 0 to about 2, said $R(NCX)_n$ compound being present in an amount in excess over that required to react with all the reactive hydrogens of said group member, the improvement which comprises effecting at least the reaction with the water in the presence of a catalytic amount of a member selected from the group consisting of N-N-bis(3-dimethyl amino propyl) acetamide and a compound having the formula

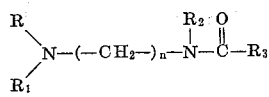

wherein

is selected from the group consisting of

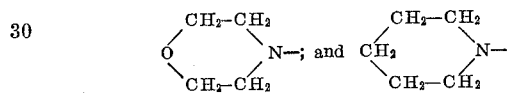

$R_2$ is a member selected from the group consisting of hydrogen and an alkyl radical and $R_3$ is selected from the group consisting of an alkyl radical and $CH_2=CH-$, and $n$ is an integer of at least 2.

2. The process of claim 1 wherein said group member is a polyalkylene ether glycol.

3. In the prepartion of a cellular polyurethane plastic by a process which comprises reacting a compound having the formula $R(NCX)_n$, wherein R is a divalent organic radical, X is a chalkogen having a molecular weight of less than 33, and $n$ is an integer of at least 2, water and a member selected from the group consisting of a polyester prepared by esterification of a dicarboxylic acid and a polyhydric alcohol, a polyalkylene ether glycol, a polyalkylene thioether glycol and a polyacetal prepared by condensing an aldehyde with an alkylene oxide, said group member having a molecular weight of at least about 500 and an hydroxyl number of not more than about 225, said polyester having an acid number of from about 0 to about 2, said $R(NCX)_n$ compound being present in an amount in excess over that required to react with all the reactive hydrogens of said group member, the improvement which comprises effecting at least the reaction with the water in the presence of a catalytic amount of N(3-acetamido propyl) morpholine.

4. In the prepartion of a cellular polyurethane plastic by a process which comprises reacting a compound having the formula $R(NCX)_n$, wherein R is a divalent organic radical, X is a chalkogen having a molecular weight of less than 33, and $n$ is an integer of at least 2, water and a member selected from the group consisting of a polyester prepared by esterification of a dicarboxylic acid and a polyhydric alcohol, a polyalkylene ether glycol, a polyalkylene thioether glycol and a polyacetal prepared by condensing an aldehyde with an alkylene oxide, said group member having a molecular weight of at least about 500 and an hydroxyl number of not more than about 225, said polyester having an acid number of from about 0 to about 2, said $R(NCX)_n$ compound being present in an amount in excess over that required to react with all the reactive hydrogens of said group member, the improvement which comprises effecting at least the reaction with the water in the presence of a catalytic amount of a compound having the formula

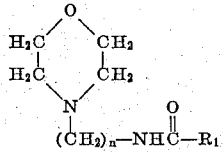

wherein $n$ is an integer of at least 2 and $R_1$ is an alkyl radical of not more than 4 carbon atoms.

5. In the preparation of a cellular polyurethane plastic by a process which comprises reacting a compound having the formula $R(NCX)_n$, wherein R is a divalent organic radical, X is a chalkogen having a molecular weight of less than 33, and $n$ is an integer of at least 2, water and a member selected from the group consisting of a polyester prepared by esterification of a dicarboxylic acid and a polyhydric alcohol, a polyalkylene ether glycol, a polyalkylene thioether glycol and a polyacetal prepared by condensing an aldehyde with an alkylene oxide, said group member having a molecular weight of at least about 500 and an hydroxyl number of not more than about 225, said polyester having an acid number of from about 0 to about 2, said $R(NCX)_n$ compound being present in an amount in excess over that required to react with all the reactive hydrogens of said group member, the improvement which comprises effecting at least the reaction with the water in the presence of a catalytic amount of N,N-bis(3-dimethyl amino propyl) acetamide.

References Cited by the Examiner

UNITED STATES PATENTS 3,019,200 1/1962 Gee et al. _____ 260—2.5
3,073,787 1/1963 Krahler _____ 260—2.5

LEON J. BERCOVITZ, *Primary Examiner.*